J. C. SEBRING.
Vehicle Axle Skein.
No. 229,920.  Patented July 13, 1880.
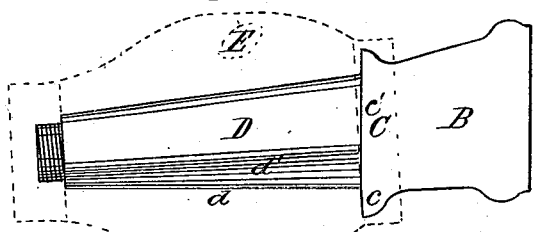
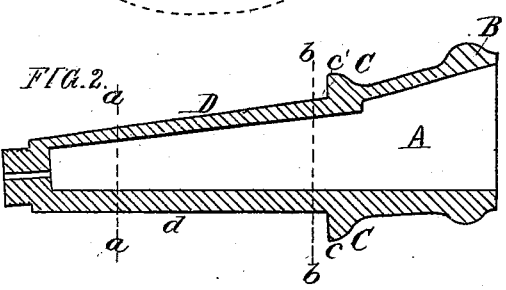
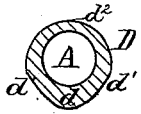 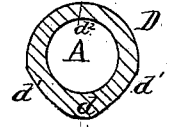
Witnesses:
Geo H Knight
Walter Allen
Inventor:
Joseph C. Sebring
By Knight & Bro
Attys

UNITED STATES PATENT OFFICE.

JOSEPH C. SEBRING, OF MILL CREEK TOWNSHIP, WABAUNSEE COUNTY, KANSAS.

VEHICLE-AXLE SKEIN.

SPECIFICATION forming part of Letters Patent No. 229,920, dated July 13, 1880.

Application filed December 31, 1879.

*To all whom it may concern:*

Be it known that I, JOSEPH C. SEBRING, of Mill Creek township, Wabaunsee county, and State of Kansas, have invented a certain new and useful Improvement in Axle-Skeins, of which the following is a full, clear, and exact description, reference being had to the accompanying drawings, forming part of this specification.

My improvement relates to a thimble-skein for wagons and other vehicles, consisting of a metal thimble for a wooden axle.

The improvement consists in forming the under part of the spindle with two places (one on each side) somewhat flattened, so as to form receptacles for grease, preventing the grease from being pressed out at the ends of the hub, and supplying it as needed to the parts of the spindle on which the most severe friction comes, and in inclining the upper part of the butting collar backward from the hub, so that the wheel-hub shall only come in contact with its lower part.

In the drawings, Figure 1 is a side view of the improvement. Fig. 2 is an axial section. Fig. 3 is a transverse section at $a$ $a$, Fig. 2. Fig. 4 is a transverse section at $b$ $b$, Fig. 2.

The spindle has a cavity, A, for the insertion of the end of the wooden axle.

The inner end of the skein consists of a ferrule or band, B, with the butting collar C at the inner or larger end of the spindle D.

The butting collar has a part, $c$, at the bottom, at right angles to the under side, $d$, of the spindle. $c'$ is the main part of the butting ring—that is to say, all of it above the part $c$. The part $c'$ inclines backward from the hub upwardly, so that the inner end of the hub does not come in contact with it, but only in contact with the part $c$. The position of the hub is shown in dotted line at E. There are advantages claimed for this in that a receptacle is provided for the grease, from which it is furnished to lubricate the bearing part $c$.

The spindle D is made with two parts, $d'$ $d'$, extending from end to end, or nearly so, of less degree of convexity than the rest, so that said parts will not be in contact with the hub, but between the hub and spindle at these points will be receptacles for grease, from which it will be carried down and up to lubricate the parts $d$ and $d^2$, with which the hub is in contact.

I claim very considerable advantage for this form of spindle, because the receptacles at $d'$ $d'$ allow the wheel to carry a much larger amount of the lubricant, and the lubricant is carried in a position to be supplied to the friction-surfaces.

In place of the two (more or less) flattened parts $d'$, there may be only one of said parts $d'$, or more than two; but I prefer the construction shown and described.

I claim as my invention—

1. In an axle-skein, the combination of butting collar C, having part $c$ at right angles to the under side of the spindle and backwardly-inclined portion $c'$, and the spindle D, having flat faces $d'$ $d'$ on two sides and the extended portion $d$ between said flattened portions, as and for the purpose set forth.

2. The butting collar C, having part $c$ at right angles to the under side of the spindle and the part $c'$ inclining backward from the hub, as described.

In testimony of which invention I have hereunto set my hand this 15th day of December, 1879.

JOSEPH C. SEBRING.

Witnesses:
SAML. KNIGHT,
GEO. H. KNIGHT.